United States Patent

[11] 3,621,951

| [72] | Inventor | Leopold Franz Schmid<br>Pischekstr. 49, Stuttgart-O, Germany |
| --- | --- | --- |
| [21] | Appl. No. | 883,461 |
| [22] | Filed | Dec. 9, 1969 |
| [45] | Patented | Nov. 23, 1971 |
| [32] | Priority | Dec. 30, 1968 |
| [33] | | Germany |
| [31] | | P 18 17 392.7 |

[54] THROTTLE VALVE
5 Claims, 3 Drawing Figs.

[52] U.S. Cl................................................ 188/322,
188/277, 137/468, 138/46, 236/93
[51] Int. Cl................................................ F16f 9/52
[50] Field of Search.......................................... 137/468;
138/46; 188/100 B, 276, 277, 322; 236/93, 101, 102

[56] References Cited
UNITED STATES PATENTS

| 2,821,268 | 1/1958 | Bourcier de Carbon | 137/468 X |
| --- | --- | --- | --- |
| 3,056,473 | 10/1962 | Zeidler | 188/100 (B) |

Primary Examiner—Harold W. Weakley
Attorney—Karl F. Ross

ABSTRACT: A throttle valve, particularly suited for hydraulic shock absorbers dashpots for motor vehicles, which automatically compensates for a change in the viscosity of the liquid flowing therethrough as a result of a liquid-temperature change. A temperature-responsive expansible ring preferably coacts with resilient valve plates to regulate the flow apertures, and may have either 1° or 2° of freedom of movement in expansion.

PATENTED NOV 23 1971  3,621,951

Inventor:
Leopold Franz SCHMID
BY
Karl F. Ross
ATTORNEY

THROTTLE VALVE

FIELD OF THE INVENTION

This invention relates to a throttle valve, and in particular a throttle valve for creating damping resistance in a hydraulic shock absorber.

BACKGROUND OF THE INVENTION

The invention particularly concerns a throttle valve in which the damping resistance is brought about by the cooperative action of throttling bores and resilient valve plates, and in which the spring characteristics of the resilient valve plates are so altered by a regulating member controlled by the temperature of the damping liquid, that the damping resistance is unaffected or is only very slightly affected by changes in the viscosity of the damping liquid arising from temperature changes.

As a rule, the damping liquid used in hydraulic shock absorbers for damping the vibrations of the chassis and wheels of motor vehicles consists of light mineral oil mixed with additives. Since motor vehicles are used in ambient temperatures of −30° C. to +40° C., and since the damping liquid is fiercely heated during a fast journey over uneven road surfaces, the temperature of the damping liquid may fluctuate between −30° C. and +160° C. In consequence, the damping resistance varies greatly as a result of the considerable changes in viscosity which are attendant on such wide temperature variations. The hydraulic shock absorbers generally used nowadays in motor vehicles have such a great damping resistance immediately after beginning a journey, when the vehicle has for example been standing out in the cold overnight, that an initial stiffening of the vehicle suspension occurs which severely impairs both the comfort and safety of the vehicle. On the other hand, when travelling at a fast speed over bad stretches of road on a hot summer day, the damping liquid is so thin that the damping resistance may fall below a permissible minimum safe level. The numerous proposals which have for a long time been put forward for controlling the damping resistance in dependence upon temperature have not been capable of practical application in shock absorbers because, if satisfactory in operation, they proved to be too expensive, complicated, large or susceptible to damage, and if inexpensive and simple in design, they did not function satisfactorily.

OBJECT OF THE INVENTION

It is an object of the present invention to provide a simple, small, inexpensive and functionally efficient throttle valve, particularly for use in hydraulic shock absorbers, whose damping resistance is unaffected or is only very slightly affected by changes in the viscosity of the damping liquid.

SUMMARY OF THE INVENTION

In accordance with the invention, there is provided a throttle valve comprising a member provided with throttling bores therethrough, resilient valve plate means cooperative with said throttling bores to create damping resistance to the flow of a damping liquid through said bores, and regulator means operative to control the spring characteristics of said valve plate means in response to the temperature of the damping liquid so that the damping resistance is substantially unaffected by changes in the viscosity of the damping liquid, said regulator means comprising a molded body of an elastically deformable material which is engageable with said valve plate means.

Preferably the molded body is mounted in a retainer which is of a material having a lower coefficient of thermal expansion than the molded body and which encompasses the molded body so that any change in the volume of the molded body which occurs in response to a change in the temperature of the damping liquid due to the comparatively large coefficient of thermal expansion of the elastically deformable material causes a change in the support conditions for said valve plate means and thereby alters the spring characteristics thereof.

The molded body is preferably annular in shape.

In one embodiment, the retainer encloses the molded body at its inner periphery, at its outer periphery, and at the side remote from said valve plate means so that the molded body has only one degree of freedom of movement towards and away from said valve plate means and engages said valve plate means at a constant radial position.

In an alternative embodiment, the retainer encloses the molded body at its inner periphery and at the side remote from said valve plate means so that the molded body has two degrees of freedom of movement axially and radially of the throttling bores.

DESCRIPTION OF THE DRAWING

The invention will be more fully understood from the following description of two embodiments of the invention which are given by way of example and are described with reference to the accompanying drawing, in which.

SPECIFIC DESCRIPTION

Figure 3:
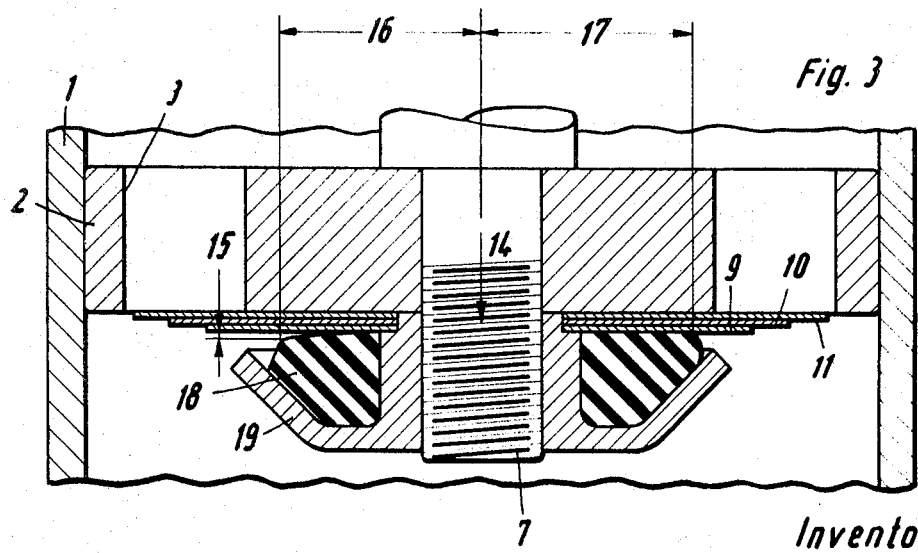

The molded body used as the regulating element in FIG. 3 affects the support provided for the resilient valve plates in that it has two degrees of freedom of movement, i.e., axially and radially with respect to the hydraulic cylinder. The state of the molded body at the left-hand side of the Figure corresponds to a damping liquid temperature of −30° C. while the state of the molded body at the right-hand side of the Figure corresponds to a damping liquid temperature of +160° C.

Figure 1:
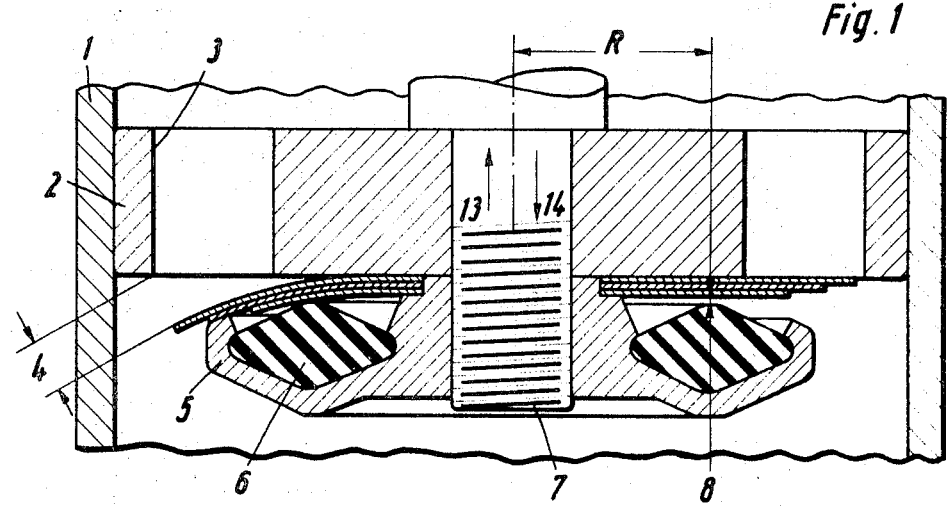
FIG. 1 is a longitudinal cross-sectional view through a throttle valve according to the invention which is adapted to function at high pressures and is secured to the piston of a hydraulic shock absorber for a motor vehicle, the molded body being used as a regulating element which affects the support provided for the resilient valve plates in that it coacts with the valve plates at a constant radius and has only one degree of freedom of movement, the vale being shown operating with a damping liquid at a temperature of −30° C.
Figure 2:
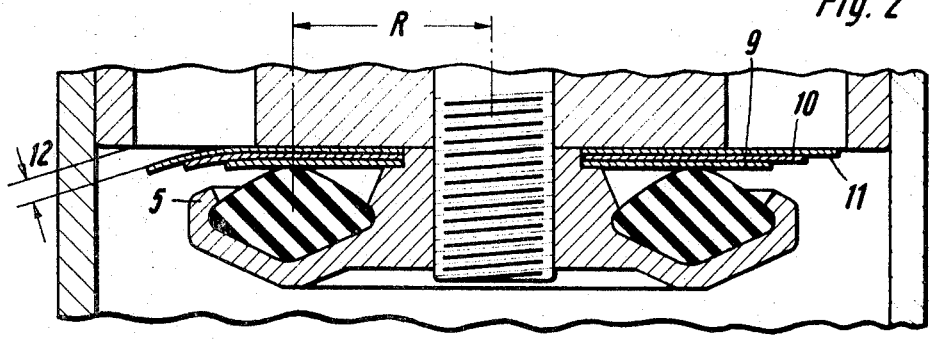
FIG. 2 is a longitudinal cross-sectional view through the throttle valve of FIG. 1 but with the damping liquid at a temperature of +160° C.; and, FIG. 3 is a longitudinal cross-sectional view through another embodiment of a throttle valve according to the invention which is likewise adapted to function at high pressures and is secured to the piston of a hydraulic shock absorber for a motor vehicle.

In the drawing, 1 indicates the working cylinder of a hydraulic shock absorber (dashpot) of a motor vehicle. The working cylinder 1 is connected to a wheel of the vehicle, and a piston rod 7 within the cylinder is connected to the chassis of the vehicle. A damping piston 2 provided with throttling bores 3 is fixedly connected to the piston rod 7 by a retainer 5 which is formed as a nut. The damping resistance of the hydraulic shock absorber arises from the cooperative action of the throttling bores 3 and resilient valve plates 9, 10, 11 mounted below the piston 2 and seated in the retainer 5. So that the damping resistance is not affected or is only very slightly affected by changes in the viscosity of the damping liquid, a regulating element 6 is provided. It is formed as a molded body of an elastically deformable material, for example rubber. The molded body 6 is annular in shape and is rhomboidal in vertical cross section, the upper corner of the rhomb supporting the valve plates at a constant radius R. The molded body 6 is encompassed by the retainer 5 at its inner periphery, at its outer periphery, and at the side remote from the resilient valve plates 9, 10, 11, so that any increase in the volume of the molded body 6 which occurs in response to a rise in the temperature of the damping liquid and as a result of the comparatively large coefficient of thermal expansion of the elastically deformable material, means that the molded body must expand upwardly and this results in a change in the support conditions for the resilient valve plates 9, 10, 11 thereby altering their spring characteristics. This alteration in the spring characteristics of the valve plates is illustrated in FIGS. 1 and 2. In FIG. 1, which corresponds to a damping liquid temperature of −30° C., the molded body 6 is spaced from the lowest valve plate 9 by a distance 8 when the piston moves downwardly in the direction of the arrow 14 so that a large throttle opening 4 is provided when the piston moved upwardly in the direction of the arrow 13 as the associated wheel moves away from the chassis. In FIG. 2, which corresponds to a damping liquid temperature of +160° C., the molded body 6 has an increased volume and the valve plates 9, 10, 11 are pressed firmly against the damping piston 2 so that a smaller throttle opening 12 is provided.

In contrast to the embodiment shown in FIGS. 1 and 2 in which any alteration in the volume of the molded body 6 can affect the support conditions for the resilient valve plates 9, 10, 11 only by a change in the axial spacing 8 due to its single degree of freedom of movement, the molded body 18 illustrated in FIG. 3 is only enclosed by a retainer 19 at its inner periphery and at the side remote from the valve plates 9, 10, 11. It thus has two degrees of freedom of movement and any change in the volume of the molded body 18 can alter the support conditions for the resilient valve plates 9, 10, 11 by a change in the elevational axial spacing 15 between the body 18 and the valve plate 9 and by a change in the point of contact therebetween over the radial distances indicated at 16 and 17. The profile of the molded body 18 illustrated at the left-hand side of FIG. 3 corresponds to a damping liquid temperature of −30° C. whilst the profile at the right-hand side corresponds to a temperature of +160° C. In FIG. 3, the resilient valve plates 9, 10, 11 are shown in both halves of the Figure in the positions which they assume on a compression movement of the associated wheel, i.e., a movement of the piston rod 7 downwardly in the direction of the arrow 14. During such a compression movement of the wheel, the throttle valve of the low pressure stage of the shock absorber operates, the valve in a so-called double-tube shock absorber being located at the base of the working cylinder.

The main advantage achieved by the present invention is that in order to provide an operationally reliable regulator only two simple parts need to be used, and these can be cheaply produced on a large scale and are so small that they can be mounted in the space available. The parts are not subjected to any abrasion and therefore have a long working life. The elastically deformable material of the regulating element which is formed as a molded body can be such that over a period of years it undergoes a slight increase in volume by liquid absorption. This increase in volume can be equated with the present loss which occurs in the course of time due to wear at the outer periphery of the damping piston and at the internal wall surface of the working cylinder.

I claim:

1. A dashpot-type piston, comprising a piston body formed with a passage for a damping medium opening along one axial end of the piston; a stack of valve plates secured at one side to said body and extending over the opening of said passage at said end for defining a throttle aperture variable with the temperature of said medium; and a control member of a volume variable with temperature mounted on said body along the face of said stack opposite that confronting said body and engageable with a side of said stack spaced from the side affixed to said body for limiting the deflection of said stack, thereby regulating the effective cross section of said aperture to maintain the damping effect substantially constant in spite of thermally induced changes in the viscosity of said medium.

2. The dashpot-type piston defined in claim 1, further comprising an annular retainer of a material with a smaller temperature coefficient of expansion than that of said member removably mounted on said body and embracing said member to permit any temperature-control changes in a volume thereof to affect the engagement of said stack with said member, said member being constituted as an annulus received in said retainer.

3. The dashpot-type piston defined in claim 2 wherein said annulus and said retainer are formed with complementary profiles.

4. The dashpot-type piston defined in claim 3 wherein said retainer receives said annulus such that temperature-controlled expansion of said member results in a variation only of the axial spacing between said member and the portion of said body confronting said stack.

5. The dashpot-type piston defined in claim 2 wherein said retainer and said body are so constructed and engaged as to permit temperature-induced variation in the volume of said member to vary the location of attack of said member on said stack.

* * * * *